United States Patent [19]
Pritchard

[11] 3,878,860
[45] Apr. 22, 1975

[54] ANCHOR FOR WHEEL SUPPORTED CROP IRRIGATION CONDUIT

[76] Inventor: Arnold J. Pritchard, Route 1, Carnegie, Okla. 73015

[22] Filed: Apr. 29, 1974

[21] Appl. No.: 465,387

[52] U.S. Cl. ............................... 137/344; 239/212
[51] Int. Cl. ........................................... A01g 25/02
[58] Field of Search ................... 239/212, 213, 177; 137/344; 188/6, 7

[56] References Cited
UNITED STATES PATENTS

| | | | |
|---|---|---|---|
| 3,143,298 | 8/1964 | Jones | 239/212 X |
| 3,230,969 | 1/1966 | Purtell | 239/212 X |
| 3,237,867 | 3/1966 | Hogg | 137/344 X |
| 3,618,859 | 11/1971 | Watts | 239/212 |
| 3,726,366 | 4/1973 | Williams | 137/344 X |

*Primary Examiner*—M. Henson Wood, Jr.
*Assistant Examiner*—John J. Love
*Attorney, Agent, or Firm*—Robert K. Rhea

[57] ABSTRACT

In a crop irrigating system, having a sprinkler head equipped elongated conduit supported by wheels for lateral movement across the land to be irrigated, an anchor is connected with the conduit in depending relation by bearings. The anchor is releasably engageable with one end of a shaft secured at its other end to the conduit to maintain the conduit stationary. The shaft rotates with the conduit and wheels about the axis of the conduit when released from the anchor thus permitting movement of the conduit in a lateral direction.

6 Claims, 4 Drawing Figures

ANCHOR FOR WHEEL SUPPORTED CROP IRRIGATION CONDUIT

BACKGROUND OF THE INVENTION

1. Field of the Invention

The present invention relates to irrigation systems and more particularly to an anchor for wheel supported crop irrigating conduits.

Crop irrigating systems presently in use usually comprise a plurality of axially connected joints generally formed of light-weight metallic material, such as aluminum, which are supported by wheels axially connected with the conduit in spaced-apart relation. The diameter of the wheels is relatively large when compared with the usual five inch or six inch diameter of the conduit so that the conduit and sprinklers, connected therewith between the wheels, are maintained in elevated relation with respect to the crops being irrigated. These wheel equipped conduits are usually moved laterally across the land to be irrigated by angular rotation of the conduit about its longitudinal axis by an engine equipped drive head connected with the conduit intermediate its ends. Valves associated with the respective sprinkler head, close when water under pressure is applied to the conduit to effect the sprinkling action through the respective sprinkler head and to open when the water pressure is discontinued from the source so that the irrigating conduit will automatically drain.

In some localities wind velocity acting on the sprinkler system, when not in use and disposed at right angle to the direction of the wind, tends to generate rotative movement of the respective ends of the conduit with the resulting torque on the conduit flipping the wheel supported drive head end-over-end. Present practice has been to connect a rod at one end to the conduit adjacent its axis with the other end of the rod extending in a downwind direction a distance at least greater than the radius of the wheels but such attempts to prevent movement and damage to the sprinkler system has resulted in the conduit being blown downwind over the rod stop in a pole vaulting action of the conduit over the position of the earth engaged end of the rod and subsequent damage to the system and its driving head. This frequently happens as a result of or during high velocity gusts of wind.

2. Description of the Prior Art

U.S. Pat. No. 3,237,867 discloses a stabilizer for supporting an irrigating system pipe by earth engaging sled legs permitting the irrigating pipe to be moved in an axial direction.

This invention, on the other hand, provides an anchor which is connected to the irrigating conduit in depending relation permitting the pipe to be angularly rotated for movement by its supporting wheels in a lateral direction across land to be irrigated and includes a shaft fixed at one end to the conduit and engageable at its other end with the anchor so that the anchor forms a counterbalance against wind induced rotation of the irrigating conduit and its wheels.

SUMMARY OF THE INVENTION

A counterweight supporting cradle means is connected by bearing means with an irrigating conduit adjacent one of its supporting wheels in a manner to permit angular rotation of the conduit and its wheels while the cradle means remains in a depending position. A shaft extends between the cradle means and the conduit and is secured at one end to the conduit for rotation therewith during lateral movement of the conduit. The other end of the shaft is provided with a mandrel engageable with the cradle means to prevent angular rotation of the conduit in either direction. A post is secured to the conduit in upstanding relation with its axis parallel with the axis of the shaft and normal to the longitudinal axis of the conduit. The post is provided with a pair of sockets respectively open laterally of the conduit for removably receiving one end portion of a pair of elongated rods or pipe to form a stop supplementing the counterweight cradle means anchoring action and preventing movement of the conduit in lateral directions during wind storms.

The principal object of this invention is to provide an anchor for wheel supported crop irrigation conduits which will permit authorized movement of the irrigation conduit in a lateral direction across the land to be irrigated.

BRIEF DESCRIPTION OF THE DRAWINGS

FIG. 4 is a fragmentary side elevational view of the anchor illustrating the manner in which the anchor connecting shaft and post supporting sockets are rotated with the conduit in relation to the counterweight supporting portion of the anchor when moving the conduit to a new position.

DESCRIPTION OF THE PREFERRED EMBODIMENT

Figure 1:
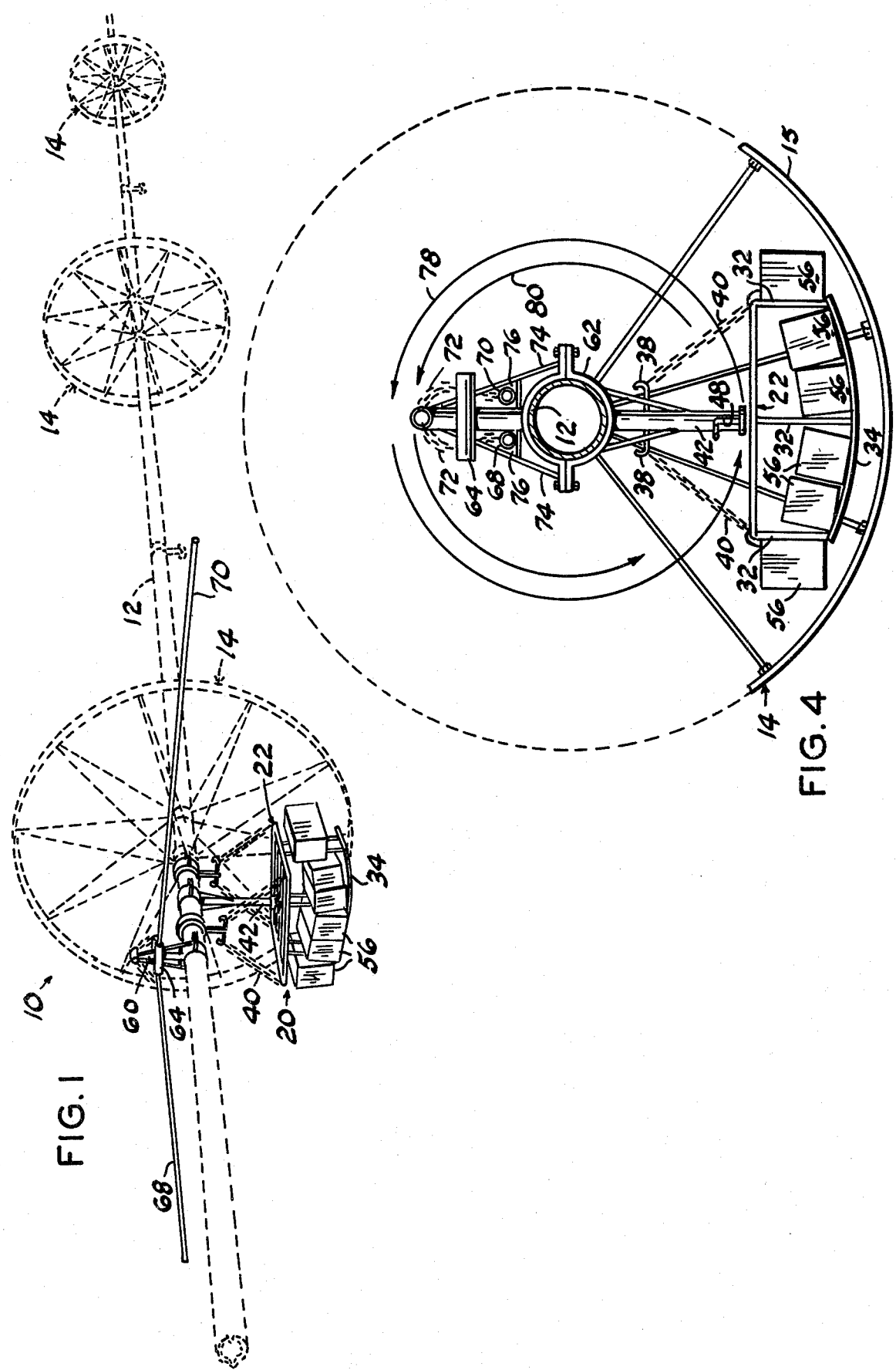
FIG. 1 is a perspective view of the device installed on a wheel supported irrigating conduit, the latter being shown by dotted lines.

Like characters of reference designate like parts in those figures of the drawings in which they occur.

In the drawings:

The reference numeral 10 indicates a fragmentary intermediate portion of a conventional crop irrigation system comprising an elongated sprinkler head equipped conduit 12 supported above the surface of the earth by a plurality of wheels 14, each having a rim 15 and being coaxially connected with the conduit in spaced-apart relation.

Figure 3:
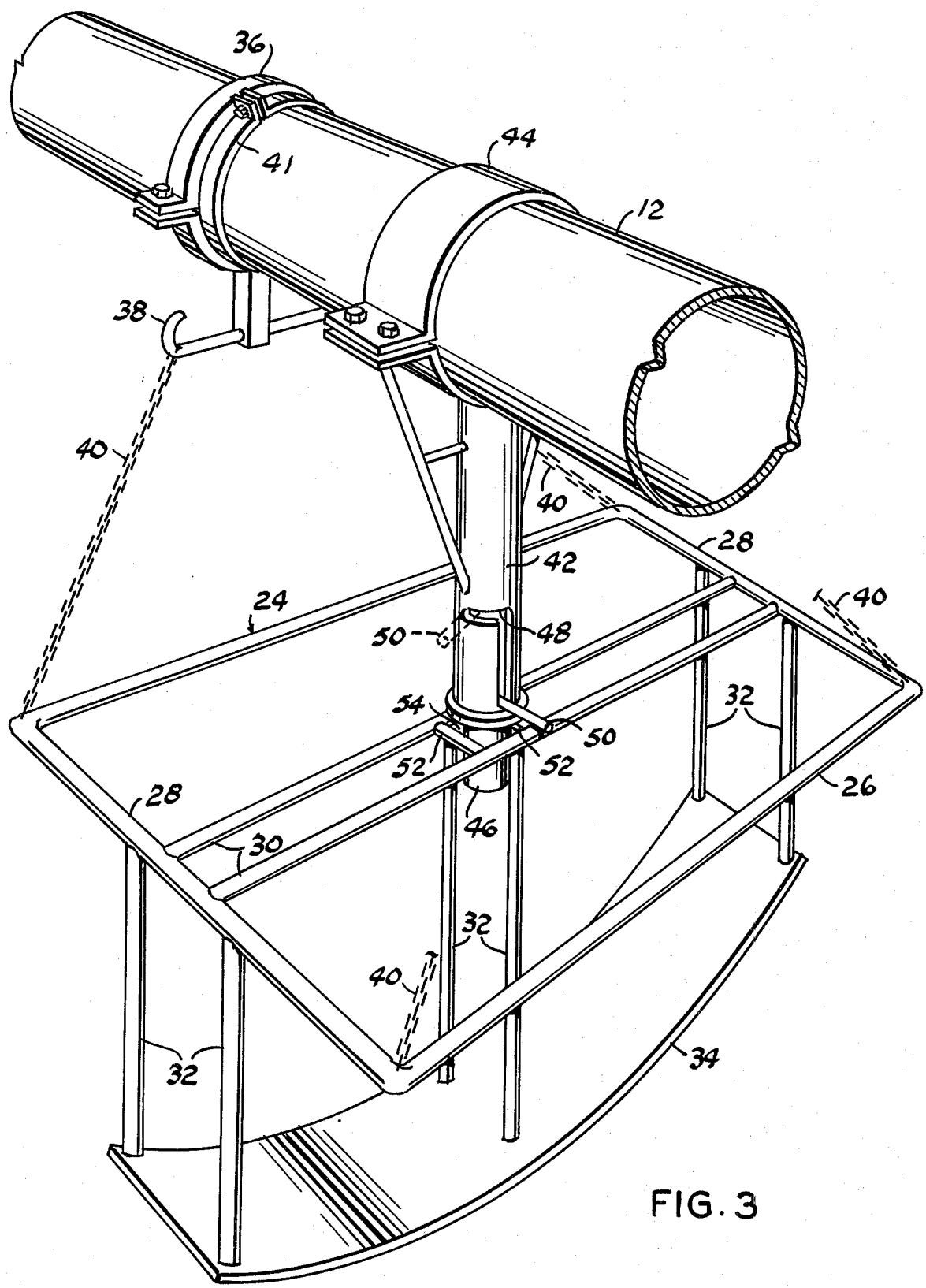
FIG. 3 is a fragmentary perspective view, to a further enlarged scale, illustrating the manner of connecting the anchor to the conduit.

The reference numeral 20 indicates the anchor device, as a whole, which is connected with the conduit 12 adjacent one of the wheels 14 in the manner presently explained. The anchor means 20 includes a cradle means 22 comprising a normally horizontal frame 24 formed by rod-like side bars 26 interconnected at their respective ends by end bars 28 to form a rectangular configuration for the frame 24 and further including parallel cross bars 30 extending between and connected with the end bars 28 in parallel spaced relation medially the width of the frame 24. A plurality of pairs of spaced-apart standards 32 are connected in depending relation to the respective end bar 28 and cross bars 30 medially their length with the standards in turn connected with a support plate 34 arcuately curved longitudinally on the same radius as the rim 15 of the wheels 14. I have found that a selected length of one of the wheel rims forms a satisfactory support plate 34. A pair of bearings 36 are connected in spaced-apart relation with the conduit 12. Each of the bearings are provided with a depending shank having a pair of aligned J-shaped hook members 38 horizontally connected with the respective depending shank and normal to the longitudinal axis of the conduit 12. Flexible connecting links, such as chains 40, are secured to the respective four corners of the frame 24 and connected at their other ends with the hook end of the respective J-hook 38 thus supporting the cradle means 22 in depending spaced relation with respect to the horizontal axis of the conduit 12. The spacing between the bearings 36 is preferably greater than the distance between the frame side bars 26 to stabilize the position of the cradle means during wind storms. The bearings are maintained in spaced-apart relation by strap clamps 41 (FIG. 3). The arcuate support plate 34 is preferably disposed in spaced relation with respect to the surface of the earth by adjustment of the chains 40 for the reasons presently apparent.

An elongated tubular shaft 42 is rigidly connected at one end to the conduit 12 by a shaft clamp 44 with the axis of the shaft 42 normal to the longitudinal axis of the conduit. The length of the shaft 42 is such that its depending end is disposed in close spaced relation with respect to the upper surface of the cradle cross bars 30. The depending end portion of the shaft 42 is provided with a mandrel 46 telescopically slidable into and out of the shaft. The wall of the shaft is provided with an inverted L-shaped slot 48 (FIG. 3) for slidably receiving a lift rod 50 connected with the mandrel for raising and lowering the latter. The depending end of the mandrel 46 is freely received between the cradle cross bars 30 and a pair of brace bars 52 extending between and connected with the cross bars 30 on opposite sides of the mandrel thus forming a frame socket 54 for receiving the depending end portion of the mandrel when telescopically extended out of the shaft 42. The shaft 42 and its mandrel 46 thus secure the cradle means 22 to the conduit 12 and form a counterbalance against angular rotation of the conduit about its longitudinal axis.

A plurality of counterweights 56, substantially box-like rectangular, as shown in the drawings and preferably formed of dense material, is supported by the upper surface of the support plate 34 and respective end bars of the frame 24.

As a safety feature an additional conduit counter rotational means is connected with the conduit 12 and comprises a post 60 rigidly secured in upstanding relation at its depending end to the conduit by a post clamp 62 with the axis of the post normal to the axis of the conduit and parallel with the shaft 42. A pair of relatively short tubes, forming sockets 64 and 66, are horizontally secured to the post in diametric opposition with the axes of the sockets normal to the axis of the conduit 12. A pair of elongated pipes or rods 68 and 70 are loosely received at one end portion by the respective socket so that the opposite or free end of each rod 68 and 70 is angularly inclined downwardly toward the surface of the earth on opposing sides of the conduit 12. The length of the respective rod 68 and 70 is preferably greater than the diameter of one of the wheels 14. The socket supported end of the respective rod is connected with the post by a flexible element, such as a chain 72. Brace rods 74 are connected with the upper end portion of the post 60 and at their other ends with the post clamp 62 to define an opening 76 between the respective rod and adjacent surface of the post so that the socket receiving end portion of the respective rods 68 and 70 may be removed from the respective socket and inserted into one of the openings 76. The other or free end of the respective rod is then temporarily tied to the conduit 12 during movement of the irrigation means 10 in a lateral direction across the surface of the earth.

OPERATION

In operation one of the counterweight means 20 having the counterweights 56 supported thereby is installed, at selected locations throughout the length of the conduit 12, as described hereinabove. When the mandrel 46 is telescopically extended into the frame socket 54 the mass of the cradle and counterweights 56 prevents lateral movement of the irrigating system 10, as by wind pressure against the conduit and wheels, by the shaft clamp 44 connected with the conduit. In the event wind force, as during a thunderstorm, or the like, is great enough to induce lateral movement of the irrigating means 10 and an angular rotational movement of the conduit 12 through an arc great enough to engage the free end of one of the rod 68 or 70 with the surface of the earth, the rod and post 60 thus form a stop acting in lever fashion against rotational movement of the wheels and conduit about the axis of the conduit.

When it is desired to move the irrigating means 10 in a lateral direction across the land to be irrigated the mandrel 46 is retracted from engagement with the frame socket 54 and is supported in its retracted position by the rod handle 50 disposed within the foot portion of the L-shaped slot 48, as shown by dotted lines (FIG. 3). The rods 68 and 70 are respectively supported by the openings 76 and temporarily secured to the conduit, as described hereinabove. The conduit and wheels 14 are then free to rotate about the axis of the conduit, as illustrated in FIG. 4. This is accomplished in a conventional manner, after discontinuing the water supply to the conduit 12 and allowing it to drain, by an angular rotational force applied to one end of the conduit 12 so that the conduit and wheels are rotated about the axis of the conduit while the shaft 42 and post 60, respectively, describe a circular path about the longitudinal axis of the conduit, as indicated by the circular arrows 78 and 80 (FIG. 4), during such movement of the conduit and wheels, the cradle supporting bearings 36 support the cradle means in depending relation with respect to the conduit.

Figure 2:
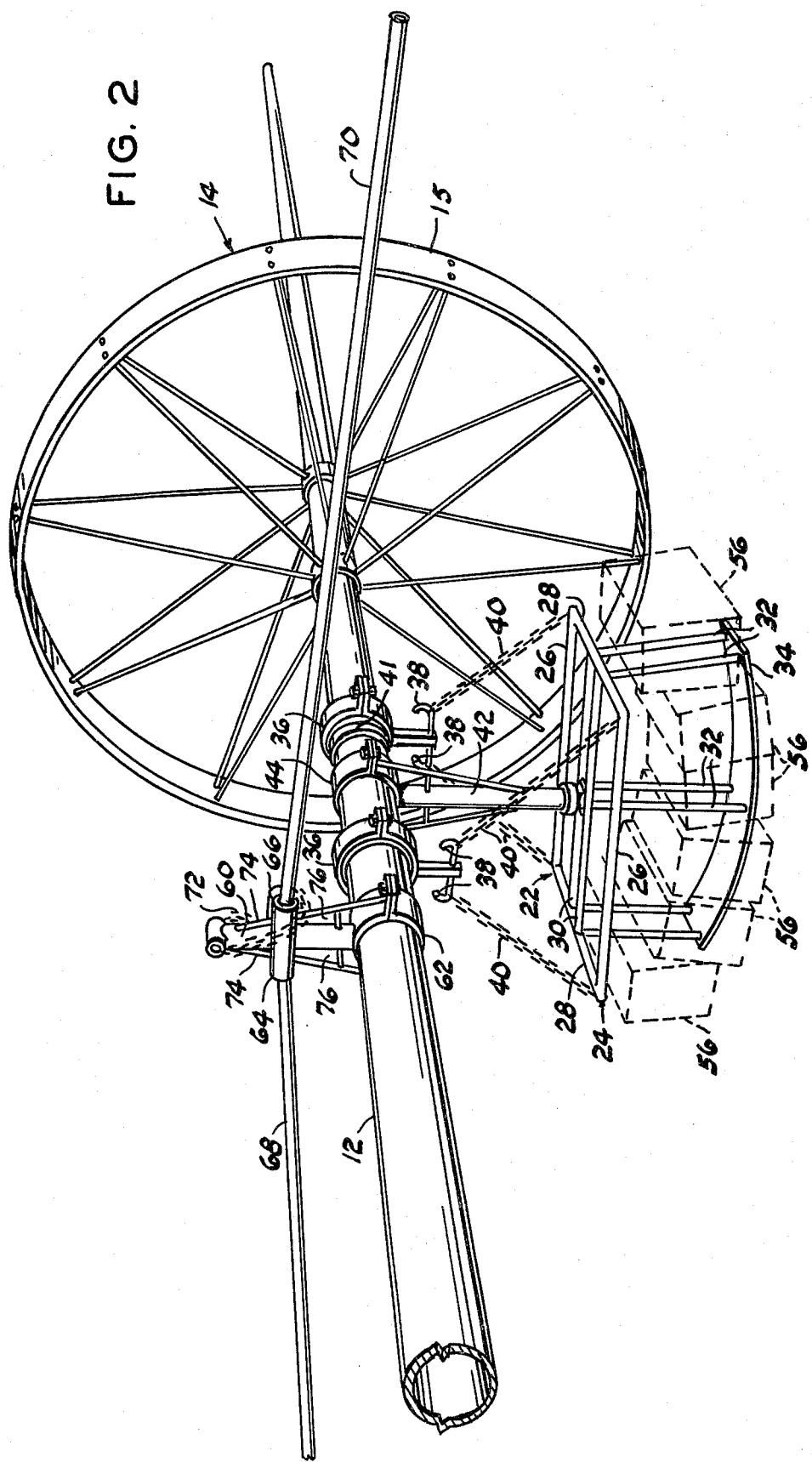
FIG. 2 is a fragmentary perspective view, to a larger scale, illustrating the relative position of the anchor with respect to one wheel with the counterweights in place thereon shown by dotted lines.

When the irrigating means has been moved to a predetermined location and the shaft 42 and post 60 are disposed vertically the mandrel 46 is again engaged with the cradle frame socket 54 and the rods 68 and 70 are supported by their respective sockets, as illustrated in FIGS. 1 and 2. Water under pressure then applied to the conduit 12 completes one cycle of operation.

Obviously the invention is susceptible to changes or alterations without defeating its practicability, therefore, I do not wish to be confined to the preferred embodiment shown in the drawings and described herein.

I claim:

1. In an irrigation apparatus having an elongated conduit coaxially connected with a plurality of wheels for lateral movement of the conduit across land to be irrigated by angular rotation of the conduit about its longitudinal axis, the improvement comprising:
- a shaft secured at one end portion to said conduit and normally depending therefrom with its longitudinal axis normal to the longitudinal axis of said conduit;
- counterweight cradle means disposed in depending relation with respect to said conduit;
- means connecting said cradle means with said conduit permitting selected angular rotation of said conduit independently of said cradle means; and,
- a mandrel means supported by said shaft and engageable with said cradle means.

2. The combination according to claim 1 in which said cradle means includes:
- a normally horizontal frame;
- a plurality of standards connected in depending relation with said frame;
- a support plate secured to the depending ends of said standards; and,
- a plurality of counterweights supported by said support plate.

3. The combination according to claim 2 in which said cradle connecting means includes:
- a pair of bearings coaxially mounted on said conduit in spaced-apart relation;
- at least one hook-shaped member connected in depending relation with each bearing; and,
- a plurality of connecting links connecting said frame with said hook-shaped members.

4. The combination according to claim 3 in which said shaft is tubular and is provided with an inverted L-shaped slot in its depending end portion,
- said frame having medially disposed cross bars forming a vertically open socket, and in which said mandrel means includes:
- a mandrel telescopically received by the depending end portion of said shaft for movement into and out of its frame socket; and,
- a lifting rod secured to said mandrel intermediate its ends and projecting laterally outward from said shaft through the L-shaped slot.

5. The combination according to claim 4 and further including:
- lever means connected with said conduit and having oppositely disposed laterally projecting end portions adapted for engaging the surface of the earth to form a stop on opposing sides of said conduit in response to angular rotation of the conduit in either direction.

6. The combination according to claim 5 in which said lever means includes:
- an upstanding post having its axis parallel with respect to the axis of said shaft;
- a pair of tubes each having one closed end and being horizontally secured in parallel relation to diametric opposite sides of the upper end portion of said post for forming a pair of post sockets respectively open laterally of said conduits; and
- a pair of elongated rods each having one end portion nested by the respective post socket.

* * * * *